(12) United States Patent
Thomas (10) Patent No.: US 7,738,530 B2
(45) Date of Patent: Jun. 15, 2010

(54) INTERFERENCE SUPPRESSION FOR PARTIAL USAGE OF SUBCHANNELS UPLINK

(75) Inventor: Timothy A. Thomas, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 679 days.

(21) Appl. No.: 11/616,099

(22) Filed: Dec. 26, 2006

(65) Prior Publication Data

US 2008/0152052 A1 Jun. 26, 2008

(51) Int. Cl.
*H04B 1/00* (2006.01)
*H04J 11/00* (2006.01)

(52) U.S. Cl. ............... 375/140; 370/203; 370/208; 370/209; 370/320; 370/335; 370/342; 370/441; 370/479

(58) Field of Classification Search .......... 375/140; 370/203, 208, 209, 320, 335, 342, 441, 479
See application file for complete search history.

(56) References Cited

U.S. PATENT DOCUMENTS

| | | | | |
|---|---|---|---|---|
| 6,441,786 | B1 * | 8/2002 | Jasper et al. ............... | 342/383 |
| 6,515,980 | B1 * | 2/2003 | Bottomley ............... | 370/342 |
| 6,826,240 | B1 | 11/2004 | Thomas et al. | |
| 6,996,197 | B2 | 2/2006 | Thomas et al. | |
| 7,103,375 | B2 * | 9/2006 | Garmonov et al. .......... | 455/506 |
| 7,248,841 | B2 * | 7/2007 | Agee et al. ............... | 455/101 |
| 7,545,852 | B2 * | 6/2009 | Fernandez-Corbaton et al. ............ | 375/148 |
| 2003/0003906 | A1 | 1/2003 | Demers et al. | |
| 2003/0035468 | A1 * | 2/2003 | Corbaton et al. ............ | 375/148 |
| 2004/0077322 | A1 * | 4/2004 | Garmonov et al. .......... | 455/133 |
| 2004/0240531 | A1 * | 12/2004 | Black et al. ............... | 375/148 |
| 2005/0288020 | A1 | 12/2005 | Cho et al. | |
| 2006/0268676 | A1 * | 11/2006 | Gore et al. ............... | 370/210 |
| 2007/0049199 | A1 * | 3/2007 | Lim et al. ............... | 455/63.1 |
| 2007/0086513 | A1 * | 4/2007 | Fernandez-Corbaton et al. ............ | 375/148 |
| 2007/0127412 | A1 * | 6/2007 | Dent ............... | 370/329 |
| 2007/0189148 | A1 * | 8/2007 | Garmonov et al. .......... | 370/204 |
| 2007/0189404 | A1 * | 8/2007 | Baum et al. ............... | 375/260 |

OTHER PUBLICATIONS

IEEE 802.16—IEEE Standard for Local and Metropolitan area Networks—Part 16: Air Interface for Fixed Broadband Wireless Access Systems, Institute of Electrical and Electronic Engineers, New York, NY, USA, Oct. 1, 2004, Section 8.4.6.2 through Section 8.4.6.2.3, pp. 568-570.

T. A. Thomas, F. W. Vook, K. Baum, "Least-Squares Multi-User Frequency-Domain Channel Estimation for Broadband Wireless Communication Systems," 37th Allerton Conference., Monticello, IL, Sep. 1999.

(Continued)

*Primary Examiner*—David C Payne
*Assistant Examiner*—Erin M File (57) ABSTRACT

Disclosed are a method, information processing system and wireless communications device for suppressing interference. The method includes receiving a transmission from each of a target (104) and interfering device (106). A set of pilot sequences (604) for an interfering device (106) and the target device (104) are determined. A channel estimate (608) for the target device (104) and the interfering device (106) is determined. A set of combining weights (610) associated with each pilot sequence for the interfering device (106) is determined as a function of the determined channel estimates (608) of the target device (104) and the interfering device (106). At least one pilot symbol estimate (612) for each pilot sequence in the set of pilot sequences for the interfering device is determined as a function of the received transmission and the determined set of combining weights (610).

20 Claims, 6 Drawing Sheets

OTHER PUBLICATIONS

F. W. Vook, T. A. Thomas, "MMSE Multi-User Channel Estimation for Broadband Wireless Communications," IEEE Globecom-2001, San Antonio TX, Nov. 26-29, 2001.

Arogyaswami Paulraj, Rohit Nabar, Dhananjay Gore, "Introduction to Space-Time Wireless Communications", Cambridge University Press 2003, pp. 218-225.

* cited by examiner

FLOW CHART OF AN ALTERNATE EMBODIMENT OF THE INVENTION (WHEN OTHER STRONG INTERFERERS ARE PRESENT)

INTERFERENCE SUPPRESSION FOR PARTIAL USAGE OF SUBCHANNELS UPLINK

FIELD OF THE INVENTION

The present invention generally relates to the field of communication systems, and more particularly relates to interference suppression for Partial Usage of Subchannels uplink channel in 802.16 systems.

BACKGROUND

Figure 2:
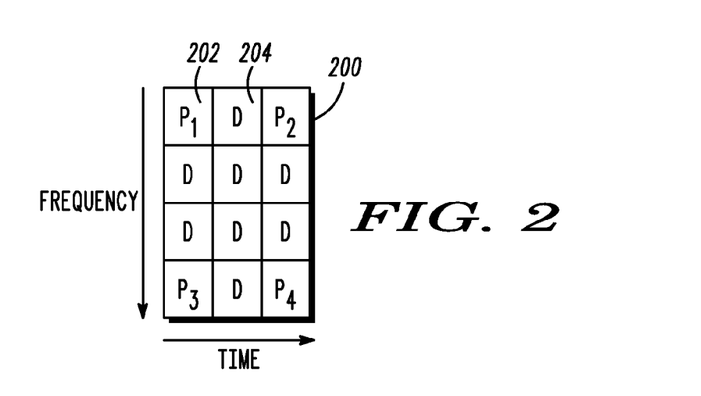
FIG. 2 is a block diagram illustrating a PUSC tile.

In IEEE 802.16 Uplink Partial Usage of SubChannels ("PUSC") permutation, the minimal signal unit for receiver processing is a tile as shown in FIG. 2. A tile comprises four consecutive tones in the frequency domain and three consecutive Orthogonal Frequency Division Multiple Access ("OFDMA") symbols. Six tiles chosen according to a pseudo random hopping sequence comprise a subchannel. A collection of subchannels used to transmit to a particular user is called an allocation. The OFDMA tiles hop around in a frequency-time grid to facilitate tone-hopping for interference mitigation where this hopping pattern is unique for each cell. The four pilot symbols (tones) existing in a tile are simply binary-phase key shifting ("BPSK") symbols and therefore there are only a total of 16 possible different pilot sequences.

In the PUSC uplink of an 802.16 system, a base station receives a PUSC tile from a desired user (the desired user is also known as a target device). This tile may be interfered with by one or more PUSC tiles received from other sectors and/or another cells. One way to suppress the interfering tiles is to employ an array of receive antennas at the base station and use one of the interference suppression methods known in the art. These interference suppression methods can be broken into two categories: ones that require knowledge of the pilot symbols to both the desired user and all interference and methods that do not require knowledge of the interferers' pilot symbols but require an estimate of the spatial correlation matrix of the interference.

The first set of methods (the ones that require knowledge of the interferers' pilot symbols) clearly work well only if the interferers' pilot symbols are known. However, the knowledge of the interferers' pilot symbols is very difficult in cellular systems especially when the interferers are in other cells. The other category of interference suppression methods try to estimate the spatial correlation matrix to the interference by first estimating the channel to the desired user and then canceling an estimate of the desired user's signal on the pilots, thereby leaving only interference. One problem with these methods is that if the interference is very strong the channel estimation to the desired user is poor which results in some of the desired signal still being present when the spatial correlation matrix to the interference is estimated. The resulting interference suppression weights then suppress some of the desired signal along with the interference resulting in poor performance.

Therefore a need exists to overcome the problems with the prior art as discussed above.

SUMMARY

Briefly, in accordance with the present invention, disclosed is a method and communication device for suppressing interference. The method comprises receiving a transmission from a target wireless device. A transmission from an interfering wireless device is received. A set of pilot sequences associated with the interfering wireless device is determined. A set of pilot sequences associated with the target wireless device is also determined. A channel estimate is determined for the target wireless device for each pilot sequence in the set of pilot sequences associated with the interfering wireless device and a channel estimate is determined for the interfering wireless device for each pilot sequence in the set of pilot sequences associated with the interfering wireless device as a function of the received transmissions, the set of pilot sequences associated with the interfering wireless device, and the set of pilot sequences associated with the target wireless device. A set of combining weights is determined for each pilot sequence in the set of pilot sequences associated with the interfering wireless device as a function of the determined channel estimate of the target device and the channel estimate of the interfering wireless device. At least one pilot symbol estimate is determined for the target communication device for each pilot sequence in the set of pilot sequences associated with the interfering device as a function of the received transmission and the determined set of combining weights.

In another embodiment and information processing system for suppressing interference is disclosed. The information processing system comprises a memory and a processor that is communicatively coupled to the memory. The information processing system also includes an interference suppression module that is communicatively coupled to the memory and the processor. The interference suppression module is receiving a transmission from a target wireless device. A transmission from an interfering wireless device is received. A set of pilot sequences associated with the interfering wireless device is determined. A set of pilot sequences associated with the target wireless device is also determined.

A channel estimate is determined for the target wireless device for each pilot sequence in the set of pilot sequences associated with the interfering wireless device and a channel estimate is determined for the interfering wireless device for each pilot sequence in the set of pilot sequences associated with the interfering wireless device as a function of the received transmissions, the set of pilot sequences associated with the interfering wireless device, and the set of pilot sequences associated with the target wireless device. A set of combining weights is determined for each pilot sequence in the set of pilot sequences associated with the interfering wireless device as a function of the determined channel estimate of the target device and the channel estimate of the interfering wireless device. At least one pilot symbol estimate is determined for the target communication device for each pilot sequence in the set of pilot sequences associated with the interfering device as a function of the received transmission and the determined set of combining weights.

In yet another embodiment a wireless communication system for suppressing interference is disclosed. The wireless communication system includes a plurality of wireless communication devices. The wireless communication system also includes a plurality of base stations, wherein each base station in the plurality of base stations is communicatively coupled to at least one wireless communication device in the plurality of wireless communication devices. At least one base station in the plurality of base stations is communicatively coupled to an information processing system.

The information processing system is for receiving a transmission from a target wireless device. A transmission from an interfering wireless device is received. A set of pilot sequences associated with the interfering wireless device is determined. A set of pilot sequences associated with the target wireless device is also determined. A channel estimate is determined for the target wireless device for each pilot sequence in the set of pilot sequences associated with the interfering wireless device and a channel estimate is determined for the interfering wireless device for each pilot sequence in the set of pilot sequences associated with the interfering wireless device as a function of the received transmissions, the set of pilot sequences associated with the interfering wireless device, and the set of pilot sequences associated with the target wireless device. A set of combining weights is determined for each pilot sequence in the set of pilot sequences associated with the interfering wireless device as a function of the determined channel estimate of the target device and the channel estimate of the interfering wireless device. At least one pilot symbol estimate is determined for the target communication device for each pilot sequence in the set of pilot sequences associated with the interfering device as a function of the received transmission and the determined set of combining weights.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

One of the advantages of certain embodiments of the present invention is that interference on a PUSC uplink can be suppressed. Certain embodiments of the present invention reduce the chance that multiple users cannot be separated by conventional antenna technology, thereby causing interference between the users. Certain embodiments of the present invention take advantage of the fact that there is a limited number of pilot sequences for the PUSC uplink. By searching over a small number of interferer pilot sequences, the best interference suppression weights can be chosen for either a single interfering source or multiple interfering sources. Certain embodiments of the present invention determine interference suppression weights for each possible interfering pilot sequence and then choose the weights that give the smallest Mean Squared Error ("MSE") of the estimated pilot symbols to the known pilot symbols for the desired user.

Wireless Communications System

Figure 1:
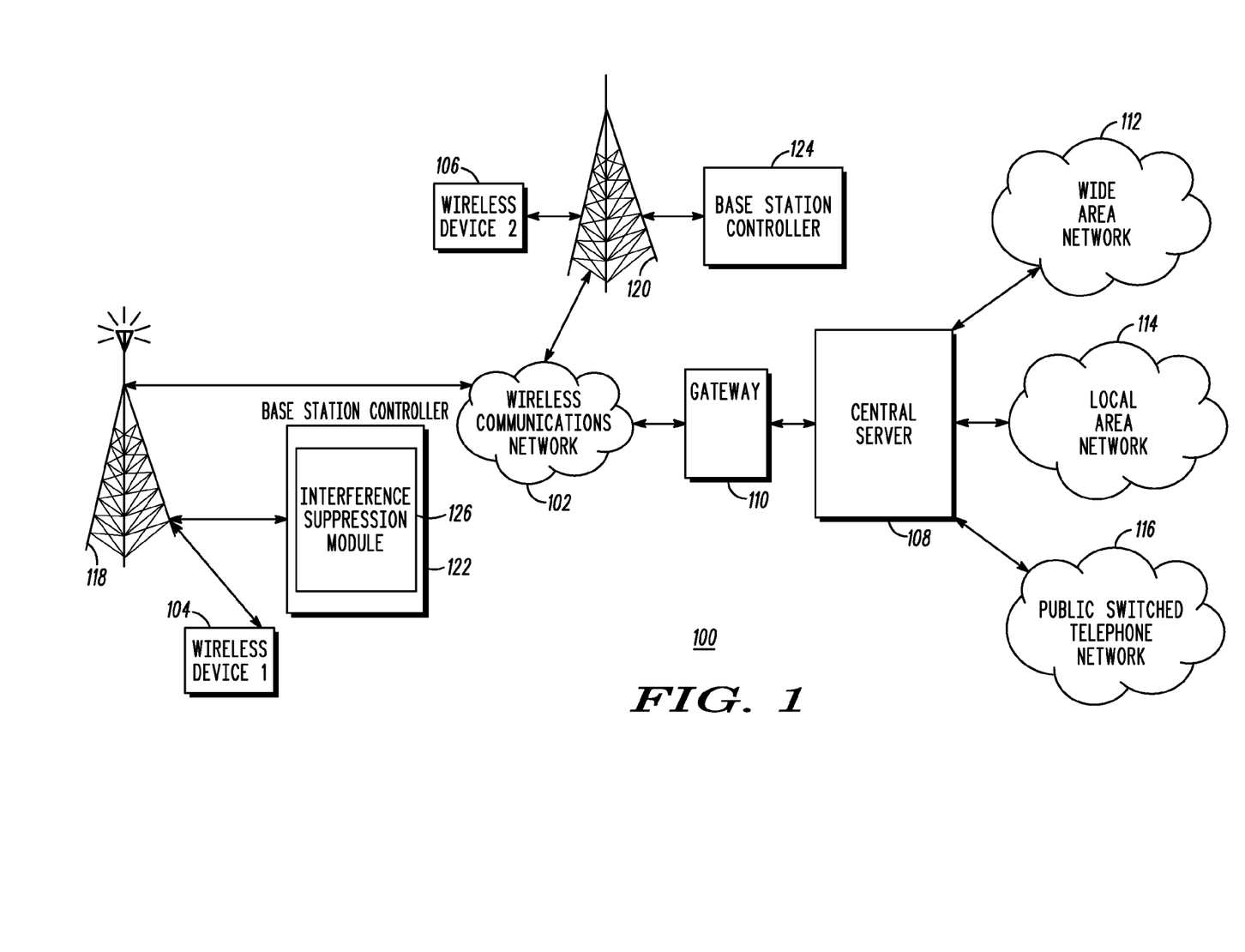
FIG. 1 is a block diagram illustrating a wireless communication system according to an embodiment of the present invention.

According to an embodiment of the present invention, as shown in FIG. 1, a wireless communications system 100 is illustrated. FIG. 1 shows a wireless communications network 102 that connects wireless communication devices 104, 106 with a central server 108 via a gateway 110. The wireless network 102 comprises a mobile phone network, a mobile text messaging device network, a pager network, a wireless internet network, or the like. Further, the communications standard of the wireless communications network 102 of FIG. 1 comprises Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), Orthogonal Frequency Division Multiplexing ("OFDM"), or the like. Additionally, the wireless communications network 102 also comprises text messaging standards, for example, Short Message Service ("SMS"), Enhanced Messaging Service ("EMS"), Multimedia Messaging Service ("MMS"), or the like.

The wireless communications network 102 supports any number of wireless communication devices 104, 106. The support of the wireless communications network 102 includes support for mobile telephones, smart phones, text messaging devices, handheld computers, pagers, beepers, wireless communication cards, or the like. A smart phone is a combination of 1) a pocket PC, handheld PC, palm top PC, or Personal Digital Assistant ("PDA"), and 2) a mobile telephone. More generally, a smartphone can be a mobile telephone that has additional application processing capabilities. In one embodiment, wireless communication cards (not shown) reside within an information processing system (not shown). The information processing system (not shown), in one embodiment, can be a personal computer, a personal, digital assistant, a smart phone, and the like.

Additionally, the wireless communication devices 104, 106 also include a local wireless link (not shown) that allows the wireless communication devices 104, 106 to directly communicate with each other without using the wireless network 102. The local wireless link (not shown), for example, is provided by a PTT communication module (not shown). The local wireless link (not shown), in another embodiment, is provided by Bluetooth, Infrared Data Access ("IrDA") technologies or the like. The central server 108 maintains and processes information for all wireless communication devices communicating on the wireless network 102.

Additionally, the central server 108, in this example, communicatively couples the wireless communication devices 104, 106 to a wide area network 112, a local area network 114, and a public switched telephone network 116 through the wireless communications network 102. Each of these networks 112, 114, 116 has the capability of sending data, for example, a multimedia text message to the wireless communication devices 104, 106.

The wireless communications system 100 also includes a group of base stations 118, 120 each comprising a base station controller 122, 124. In one embodiment, the wireless communications network 102 is capable of broadband wireless communications utilizing time division duplexing ("TDD") as set forth, for example, by the IEEE 802.16 standard. The duplexing scheme TDD allows for the transmissions of signals in a downstream and upstream direction using a single frequency. It should be noted that the present invention is not limited to an 802.16 system for implementing TDD. Other communication systems that this invention may be applied to include UMTS, 3GPP-LTE, 802.11 systems, 802.20 systems, and the like. Furthermore, the wireless communications system 100 is not limited to a system using only a TDD scheme. For example, TDD may be only used for a portion of the available communication channels in the system 100, while one or more schemes (for example frequency division duplexing ("FDD") are used for the remaining communication channels.

In one embodiment, each base station controller 122, 124 includes multiple receive antennas and an interference suppression module 126 for suppressing interference on the PUSC uplink in an 802.16 system. It should be noted that the 802.16 PUSC uplink is only used as an illustrative example. The present invention is applicable to uplinks in other standards mentioned above and is also applicable to the downlink in similar standards). In 802.16 systems, the PUSC uplink subchannel includes six PUSC tiles. FIG. 2 shows an example of a PUSC tile 200 including pilot symbols 202 and data symbols 204. The tiles 200 in an uplink subchannel are interleaved across the entire bandwidth through a scrambling of the tiles across frequency, wherein the scrambling is different in each sector. In one embodiment, each PUSC tile 200 is processed separately by the base station controller 122, 124.

Figure 3:
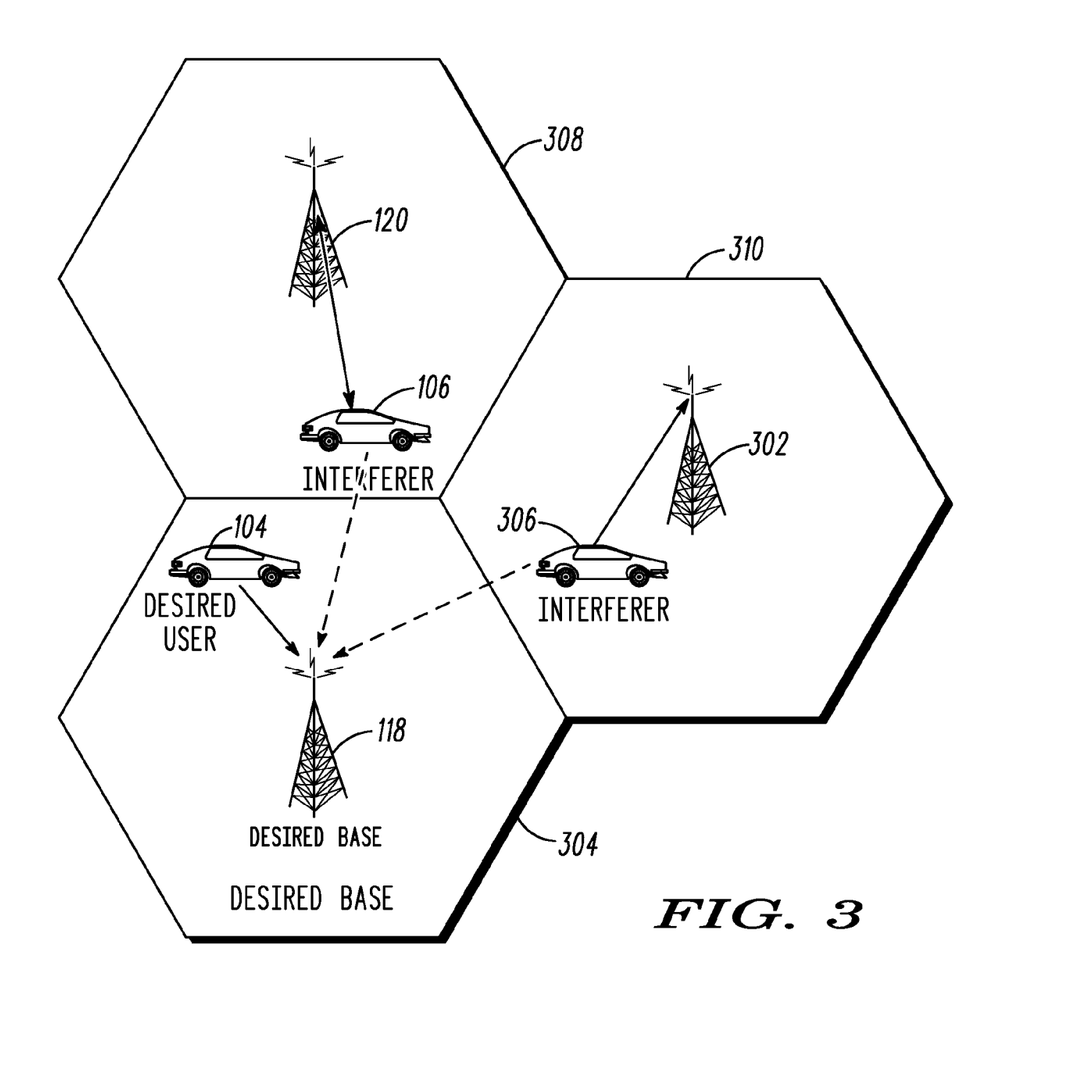
FIG. 3 is a block diagram illustrating a wireless communication environment wherein a base station receives PUSC tiles from a desired user along with interfering PUSC tiles.

In an 802.16 system, a base station 118, 120 may receive a PUSC tile 200 from a desired user and a PUSC tile 200 from interfering users in the same cell or adjacent cells where all tiles are received on the same frequencies and times. For example, FIG. 3 shows one example of a base station 118 receiving interfering PUSC tiles 200 from users in adjacent cells (wireless communication devices 106, 306) as well a PUSC tile 200 from a desired user (wireless communication device 1 104). The base station 118 in cell A 304 is receiving a PUSC tile 200 from the wireless communication device 1 104. Adjacent cells such as cell B 308 and cell C 310 also include base stations 120, 302 communicating with respective wireless communication devices 106, 306. However, because the wireless communication devices 106, 306 in cell B 308 and cell C 310 are close to the border of cell A 304, the base station 118 in cell A 304 also receives the PUSC tiles 200 of these wireless communication devices 106, 306 at a relatively high signal strength.

Interference occurs because the PUSC tiles 200 received from other wireless devices, wireless communication devices 106, 306 in the example FIG. 2, are received on the same frequencies and times as the PUSC tile 200 for wireless communication device 1 104. The pilot symbols 202 present on all the PUSC tiles (both for the desired user and the interferers) may be used to design interference suppression weights that enable the clean reception of the data symbols 204 for the desired user 104. As discussed in greater detail below, interference suppression weights are weightings applied to the received PUSC tiles 200 on each receive antenna. The interference suppression weights, when multiplied by the PUSC tiles received at a receive array at the base station 118 and summed across the receive antennas, suppress the interfering PUSC tiles 200 for wireless communications devices 106, 306 while equalizing the PUSC tile 200 for the desired user 104 (i.e., wireless communication device 1 104). However in 802.16, the pilots symbols 202 in a PUSC tile 200 are BPSK (i.e., are only either +1 or −1) and therefore there are only 16 possible pilot sequences (a pilot sequence, also known as a training sequence, is the set of four pilot symbols 202 in a PUSC tile 200) in one PUSC tile 200.

Thus, because there is a total of 16 possible pilot sequences, there is a one in eight chance that an interferer effectively has the same pilots as the desired mobile on a given tile. The reason there is only eight effective pilot sequences instead of 16 is because when employing linear processing (i.e., applying interference suppression weights) at an array of receive antennas, one received pilot sequence at the receive array is spatially equal to the negative of the same received pilot sequence at the receive array. This means that if the interfering signal (e.g., the PUSC tile 200 from wireless device 106) has a pilot sequence that is the same as or is the negative of the desired user's 104 pilot sequence, then the interfering signal is spatially equal to the desired user's 104 pilot sequence. When this situation happens it is impossible to separate the interferer from the desired mobile using the pilots alone. The base station may not know the number of interfering tiles or the pilot sequence to the interfering tiles.

However, in the case where the interfering signal has a pilot sequence that is not the same as nor is the negative of the desired user's 104 pilot sequence, then linear interference suppression weights can be found to spatially suppress the interfering signals and recover the desired user's 104 data symbols 204. Note that since there are effectively only eight pilot sequences, it is possible (i.e., with low computational complexity) to search over all possible pilot sequences of the interferer (as will be described below).

One advantage of certain embodiments of the present invention is that the interference suppression module 126 does not need to know the pilot symbols of the interferer because, as just described, there are few (i.e., only eight) possible pilot sequences of the interferer that need to be searched over. The interference suppression module 126, in one embodiment operates by exploiting the pilot structure of the PUSC uplink, which involves four BPSK pilots (i.e., the pilot sequence on the PUSC tile). Thus a search over all possible combinations of the interferer's pilot symbols only requires a search over eight possible pilot sequences (also as described above, although there are sixteen possible sequences, for interference suppression, a given pilot sequence and the negative of the same sequence gives the same interference suppression weights). The interfering signals 106, 306 can be received at the desired base 118 at various power levels and thus the interference environment at the desired base 118 can be described as low interference to high interference. The interference suppression module 126 is discussed in greater detail below.

Information Processing System

Figure 4:
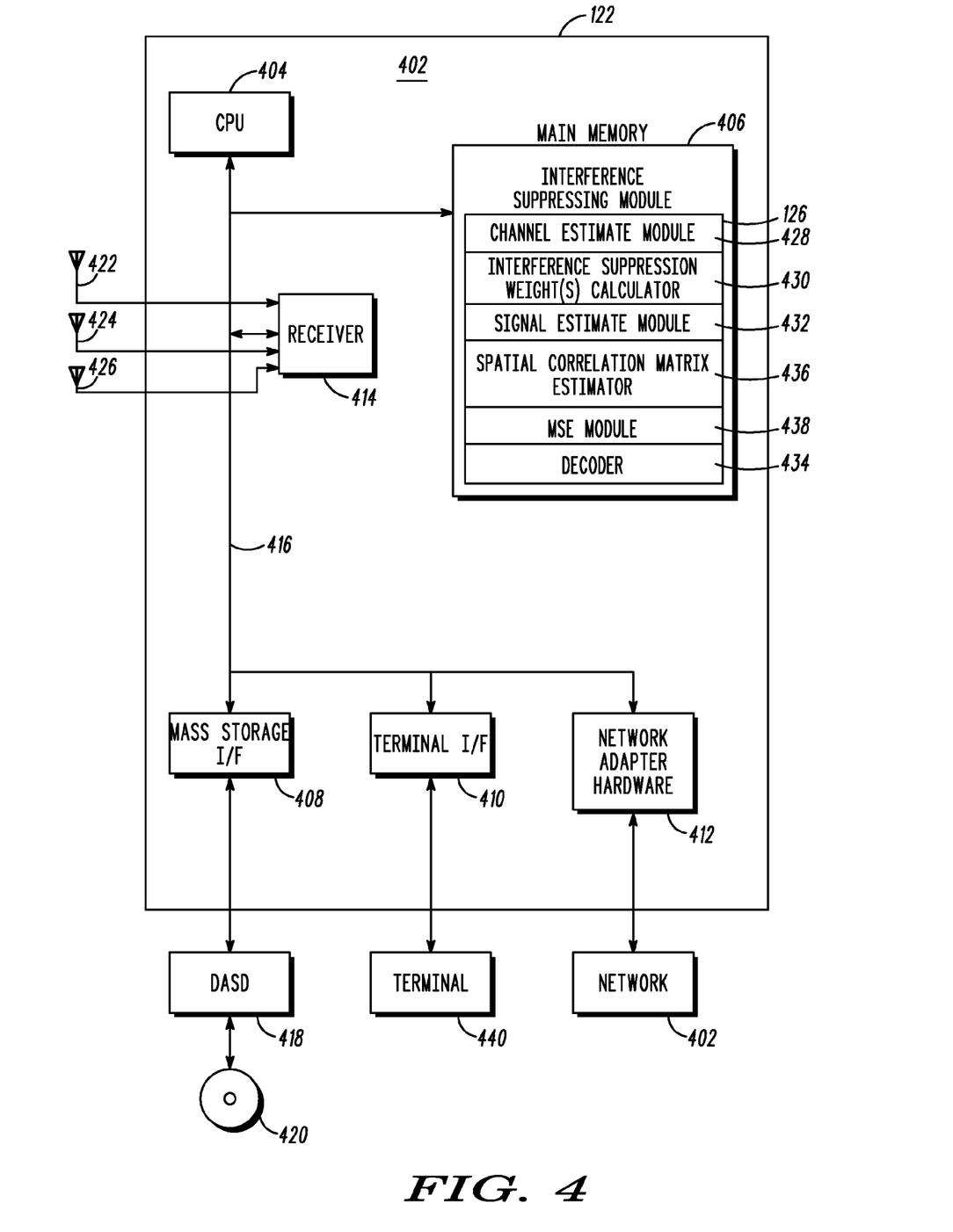
FIG. 4 is a block diagram illustrating an information processing system according to an embodiment of the present invention.

FIG. 4 is a block diagram illustrating a detailed view of an information processing system such as the base station controller 122 according to an embodiment of the present invention. It should be noted that the present invention can reside within any information processing system and is not limited to the base station controller 122. Therefore, the following discussion is applicable to any information processing system comprising the present invention. Throughout the following discussion of FIG. 4, the base station control 122 is referred to as information processing system 122.

In one embodiment, the information processing system 122 resides within its respective base station 118. In another embodiment, the information processing system 122 resides outside of and is communicatively coupled to its respective base station 118. The information processing system 122, in one embodiment, is based upon a suitably configured processing system adapted to implement the exemplary embodiment of the present invention. Any suitably configured processing system is similarly able to be used as the information processing system 122 by embodiments of the present invention, for example, a personal computer, workstation, or the like.

The information processing system 122 includes a computer 402. The computer 402 has a processor 404 that is communicatively connected to a main memory 406 (e.g., volatile memory), non-volatile storage interface 408, an optional terminal interface 410, an optional network adapter hardware 412, and a receiver 414. A system bus 416 interconnects these system components. The non-volatile storage interface 408 is used to connect mass storage devices, such as data storage device 418, to the information processing system 122. One specific type of data storage device is a computer readable medium such as a CD drive, which may be used to store data to and read data from a CD or DVD 420 or floppy diskette (not shown). Another type of data storage device is a data storage device configured to support, for example, NTFS type file system operations.

The receiver 414 is communicatively coupled to a plurality of antennas 422, 424, 426 (note that only three antennas are shown in the example and that more than three antennas may be present). As the receiver 414 receives signals such as an uplink channel signal including PUSC tiles, each signal is passed on to the interference suppression module 126. The example of FIG. 4 shows the interference module 126 as residing in the main memory 406. However, the interference module can alternatively be implemented within hardware such as the receiver 414. The interference suppression module 126, in one embodiment, includes a channel estimate module 428, an interference suppression weight(s) calculator 430, a signal estimate module 432, a decoder 434, a spatial correlation matrix estimator 436, and an MSE module 438. Each of these components is discussed in greater detail below.

Although illustrated as concurrently resident in the main memory 406, it is clear that respective components of the main memory 406 are not required to be completely resident in the main memory 406 at all times or even at the same time. In one embodiment, the information processing system 122 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the information processing system 122.

Although only one CPU 404 is illustrated for computer 402, computer systems with multiple CPUs can be used equally effectively. Embodiments of the present invention further incorporate interfaces that each includes separate, fully programmed microprocessors that are used to off-load processing from the CPU 404. Terminal interface 410 is used to directly connect one or more terminals 440 to computer 402 to provide a user interface to the computer 402. These terminals 440, which are able to be non-intelligent or fully programmable workstations, are used to allow system administrators and users to communicate with the thin client. The terminal 440 is also able to consist of user interface and peripheral devices that are connected to computer 402 and controlled by terminal interface hardware included in the terminal I/F 410 that includes video adapters and interfaces for keyboards, pointing devices, and the like.

An operating system (not shown), according to an embodiment, can be included in the main memory and is a suitable multitasking operating system such as the Linux, UNIX, Windows XP, and Windows Server 2001 operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 412 is used to provide an interface to the network 102. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD ROM 420, or other form of recordable media, or via any type of electronic transmission mechanism.

Interference Suppression

As discussed above, the receiver 414 receives a PUSC tile from a desired user on a given time and frequency resource and can also receive by one or more interfering PUSC tiles from other sectors and/or another cell(s) on the same time and frequency resource. The received signal can be denoted as an M×1 vector (where M is the number of receive antennas) and is received on subcarrier k and OFDM symbol number b. The received signal vector is given as (without loss of generality it is assumed that $0 \leq k \leq 3$ and $0 \leq b \leq 2$ corresponding to the data and pilot locations in one example PUSC tile 200 whereas in practice k and b would likely be values outside of this range):

$$Y(k, b) = \sum_{u=1}^{N_s} H_u(k, b) X_u(k, b) + N(k, b) \quad (1)$$

where $N_s$ is the number of signals where the pilot sequence is known (or the signals whose pilot sequences will be searched over as explained below), $H_u(k,b)$ is the channel for mobile u (both desired user and interferer), $X_u(k,b)$ is the data or pilot symbol for mobile u, and $N(k,b)$ includes both additive noise plus interferers where the pilot sequence is unknown. An example of the pilot sequence for mobile u for the PUSC tile 200 is $\{X_u(0,0), X_u(0,2), X_u(3,0), X_u(3,2)\}$ which take on values of +1 or −1 (or a scalar multiple of +1 or −1). The additive noise can be assumed to have a correlation matrix given as $\sigma_n^2 I_M$ where $I_m$ is an m×m identity matrix. In one example, it is assumed that the desired mobile is mobile u=1 in (1).

Interference Suppression: Channel Estimation

In one embodiment, the interference suppression module 126 determines channel estimates to the desired user and the dominate interfering user during suppression of the interference. The following example of channel estimation assumes that there is only one dominant interferer and the desired user's pilot symbols are all +1 (this situation is created by multiplying the received signal at the pilot locations by the desired user's pilot symbol). The following channel estimation procedures performed by the channel estimate module 428 assume that the pilot symbols for the interfering mobile are known by the base station 118, but this will not likely be the case. Certain embodiments of the invention operate when the interferer's pilots are unknown and work by searching over all combination of pilot symbols for the interferer. The details are given below.

For simplicity and without loss of generality, minimum-mean square error interference suppression ("MMSE") interference suppression is discussed as one only example for the present invention. However, the present invention can be easily extended to other technologies. For the calculation of the MMSE interference suppression weights in block 430, channel estimates are needed from the channel estimation module 428. The channel estimator can be any current or future channel estimator and in one embodiment, the channel estimate module 428 is a multi-user MMSE channel estimator module that tracks the channels across frequency and time. In another embodiment, the channel estimator module 428 is an average channel estimator module that finds one channel estimate over one PUSC tile 200.

Note that only one combining weight needs to be computed over one PUSC tile 200 for the average channel estimator because only one channel estimate for the desired user and dominant interferer is found for the entire PUSC tile 200. However, because a different channel estimate is found at each frequency and time in a PUSC tile 200 for the MMSE channel estimator, the MMSE weights calculated from the MMSE channel estimator need to be different on each frequency and time in a PUSC tile 200.

In the example where the channel estimate module 428 is a multi-user MMSE channel estimator, channel estimates are determined to both the desired user and the dominant interferer. In this example, it is assumed that the desired user's pilots are all +1 and the interferer's pilots are P1, P2, P3, and P4. FIG. 2 shows one example for the placement of pilots in a PUSC tile 200. Also, in this example, it is assumed that the frequency and time correlations are known and may, respectively, be given as:

$$r_f(k) = e^{j\pi\tau_{max}Fk} \frac{\sin(\pi\tau_{max}Fk)}{\pi\tau_{max}Fk} \quad \text{(Eq. 2)}$$

$$r_t(n) = \frac{\sin(2\pi f_d nT)}{2\pi f_d nT} \quad \text{(Eq. 3)}$$

where F is the frequency separation in Hertz between subcarriers (e.g., 11.2 kHz), $\tau_{max}$ is the maximum expected delay spread in seconds, $f_d$ is the expected Doppler frequency in Hertz, and T is the time in seconds between OFDM symbols (e.g., 100.45 μsec).

The MMSE channel estimate on antenna m for user u (e.g., u=1 for desired user and u=2 for interferer) is given as:

$$\hat{H}_{m,u}(k,b) = w_u^H(k,b) Y_m \quad \text{(Eq. 4)}$$

where 4×1 $Y_m$ is given as ($Y_m(k,b)$ is the $m^{th}$ element of $Y(k,b)$ from (1))

$$Y_m = \begin{bmatrix} Y_m(0,0) \\ Y_m(3,0) \\ Y_m(0,2) \\ Y_m(3,2) \end{bmatrix} \quad \text{(Eq. 5)}$$

The M×1 MMSE estimator on subcarrier k and OFDM symbol b is given as:

$$w_u(k,b) = Q^{-1} p_u(k,b) \quad \text{(Eq. 6)}$$

where M×M Q and M×1 $p_u(k,b)$ are given as (assuming that $P_1$ through $P_4$ are real valued):

$$Q = R + \sigma_i^2 \begin{bmatrix} P_1 & 0 & 0 & 0 \\ 0 & P_3 & 0 & 0 \\ 0 & 0 & P_2 & 0 \\ 0 & 0 & 0 & P_4 \end{bmatrix} R \begin{bmatrix} P_1 & 0 & 0 & 0 \\ 0 & P_3 & 0 & 0 \\ 0 & 0 & P_2 & 0 \\ 0 & 0 & 0 & P_4 \end{bmatrix} + \sigma_n^2 I_4 \quad \text{(Eq. 7)}$$

$$p_1(k,b) = \begin{bmatrix} r_f(k) r_t(b) \\ r_f(k-3) r_t(b) \\ r_f(k) r_t(b-2) \\ r_f(k-3) r_t(b-2) \end{bmatrix} \quad \text{(Eq. 8)}$$

$$p_2(k,b) = \begin{bmatrix} P_1 r_f(k) r_t(b) \\ P_3 r_f(k-3) r_t(b) \\ P_2 r_f(k) r_t(b-2) \\ P_4 r_f(k-3) r_t(b-2) \end{bmatrix}$$

where $\sigma_i^2$ is the interferer's power (relative to the desired user's power which, without loss of generality, is assumed to be one on average) and 4×4 R is given as:

$$R = \begin{bmatrix} 1 & r_f(3) & r_t(2) & r_f(3) r_t(2) \\ r_f^*(3) & 1 & r_f^*(3) r_t(2) & r_t(2) \\ r_t(2) & r_f(3) r_t(2) & 1 & r_f(3) \\ r_f^*(3) r_t(2) & r_t(2) & r_f^*(3) & 1 \end{bmatrix} \quad \text{(Eq. 9)}$$

If the power of the interferer is unknown, $\sigma_i^2$ is set equal to 1.

As discussed above, the channel estimate module 428 can also be an average channel estimate module that finds one channel estimate over one PUSC tile 200. In one embodiment, the channel estimator module 428 determines average channel estimates when the dominant interferer's pilots satisfy $$\sum_{l=1}^{4} P_l = 0.$$

If the channel does not significantly change over one PUSC tile 200, then the interferer can be averaged out of the channel estimate for the desired user (and vice versa). The channel estimate to the desired mobile on every subcarrier in the PUSC tile is given as:

$$\hat{H}_{m,1}(k, b) = \frac{1}{4} 1^T Y_m \qquad \text{(Eq. 10)}$$

where 1 is a 4×1 vector of ones and $Y_m$ is given in (5). The channel estimate to the dominant interferer is given as:

$$\hat{H}_{m,2}(k, b) = \frac{1}{4}[P_1, P_3, P_2, P_4] Y_m \qquad \text{(Eq. 11)}$$

In another example, the interferer's pilot symbols are +1 except for $P_l$, which is −1. In this example, let $k_l$ and $b_l$ be the subcarrier and time of interferer pilot $P_l$. Then the desired user's channel can be estimated by the channel estimate module 428 as:

$$\hat{H}_{m,1}(k, b) = Y_m(k_l, b_l) + \frac{1}{3} \sum_{\substack{z=1 \\ z \neq l}}^{4} Y_m(k_z, b_z) \qquad \text{(Eq. 12)}$$

The interferer's channel can be estimated by the channel estimate module 428 as:

$$\hat{H}_{m,2}(k, b) = \frac{1}{3} \sum_{\substack{z=1 \\ z \neq l}}^{4} Y_m(k_z, b_z) - Y_m(k_l, b_l) \qquad \text{(Eq. 13)}$$

A situation can also occur where all of the interferer's pilot symbols are −1 except for $P_l$, which can be +1. In this example, let $k_l$ and $b_l$ be the subcarrier and time of interferer pilot $P_l$. Then the desired user's channel can be estimated by the channel estimator module 428 as:

$$\hat{H}_{m,1}(k, b) = Y_m(k_l, b_l) + \frac{1}{3} \sum_{\substack{z=1 \\ z \neq l}}^{4} Y_m(k_z, b_z) \qquad \text{(Eq. 14)}$$

The interferer's channel can be estimated by the channel estimate module 428 as:

$$\hat{H}_{m,2}(k, b) = Y_m(k_l, b_l) - \frac{1}{3} \sum_{\substack{z=1 \\ z \neq l}}^{4} Y_m(k_z, b_z) \qquad \text{(Eq. 15)}$$

In another example, all of the interferer's pilot symbols are +1 or all of the interferer's pilot symbols are −1. In this example, the interferer has a pilot sequence that does not allow the channel estimator to distinguish it from the desired mobile. Therefore, the channel estimator module 428

$$\hat{H}_{m,1}(k, b) = \frac{1}{4} 1^T Y_m \qquad \text{(Eq. 16)}$$

is used to estimate channels to the desired mobile the interferer is assumed to be at low enough power as to not cause significant interference. In other words, the channel to the interferer is set to zero.

Interference Suppression: Single Interferer

Once the channel estimates are determined, the interference suppression module 126 continues with the interference suppression process. Since, as discussed above, for the PUSC uplink there are only eight pilot sequences that need to be searched over for a single interferer, all combinations can be searched. The interference suppression module 126 via the interference suppression weight calculator 430 determines combining weights from channel estimates (for both the desired user and the dominant interferer) for each of the eight possible interferer pilot sequences. The interference suppression module 126 then selects the channel estimate for the desired user and interferer as well as combining weights that give the lowest MSE (calculated by the MSE module 438) to the desired user's pilots. This process is discussed in greater detail below.

It should be noted that although there are sixteen possible sequences, for interference suppression a given pilot sequence and the negative of the same sequence give the same results. Thus, only the pilot sequences shown in Table 1 below need to be searched over for the PUSC tile 200 example. Note that Table 1 is only one example of pilot sequences that can be searched over and the invention is not limited to just these eight pilot sequences. For example, an equally valid set of pilot sequences is to negate one or more of the rows in the table. Another equally valid set of pilot sequences is to multiply one or more of the rows in Table 1 by a complex scalar. Also, the invention is not just limited to the PUSC tile format 200 and can be used for any type of pilot sequence. In the case that the PUSC tile format 200 is not used, an alternate set of interferer pilot sequences can be determined and used in place of the ones shown in Table 1.

TABLE 1

Interferer's pilot sequences that the algorithm searches over.

|  | $P_1$ | $P_2$ | $P_3$ | $P_4$ |
| --- | --- | --- | --- | --- |
| Sequence 1 | +1 | +1 | +1 | −1 |
| Sequence 2 | +1 | +1 | −1 | +1 |
| Sequence 3 | +1 | −1 | +1 | +1 |
| Sequence 4 | −1 | +1 | +1 | +1 |
| Sequence 5 | +1 | +1 | −1 | −1 |
| Sequence 6 | +1 | −1 | +1 | −1 |
| Sequence 7 | +1 | −1 | −1 | +1 |
| Sequence 8 | +1 | +1 | +1 | +1 |

As discussed above, the channel estimate module 428 determines a channel estimate for the desired mobile (l=1) and the dominant interferer (l=2) for receive antenna m and each of the eight interferer pilot sequences from Table 1 (s=1, . . . ,8), $\hat{H}_{m,l,s}(k,b)$ (in other words this channel estimate, $\hat{H}_{m,l,s}(k,b)$, is associated with the interfering wireless device's pilot sequence s). This channel estimate can be either the MMSE channel estimates discussed above, the average channel estimates discussed above, or any other channel estimate found from a current or future channel estimator. In the preferred embodiment, the interference suppression weight calculator 430 determines combining weights for the desired user for each sequence (s=1, . . . ,8) from (this is the combining weight associated with the interfering wireless device's pilot sequence s):

$$w_s(k,b)=H_s(k,b)\{R_s(k,b)\}_1 \quad \text{(Eq. 17)}$$

where $\{A\}_n$ means the $n^{th}$ column of the matrix A and M×2 $H_s(k,b)$ and 2×2 $R_s(k,b)$ are given as ($H_{l,s}(k,b)$ is an M×1 channel estimate for user l with its $m^{th}$ element being $\hat{H}_{m,l,s}(k,b)$):

$$H_s(k,b)=[H_{1,s}(k,b),H_{2,s}(k,b)] \quad \text{(Eq. 18)}$$

$$R_s(k,b)=(H_s^H(k,b)H_s(k,b)+\sigma_n^2 I_2)^{-1} \quad \text{(Eq. 19)}$$

It should be noted that for an average channel estimator, there is only one weight over the entire PUSC tile 200. Also note that although in the preferred embodiment the interference suppression weight calculator module 430 used the MMSE combining weights described above, other interference suppression weight calculations as known in the art can be used such as zero forcing or alternate MMSE calculations. In addition if the modulation type of the interferer is known, the interference suppression techniques of successive cancellation or maximum likelihood decoding may also be employed.

The signal estimate module 432 determines received signal estimates at each pilot symbol for each interferer pilot sequence (this is the signal estimate associated with interfering wireless device's pilot sequence s), $\hat{x}_s(k_p,b_p)=w_s^H(k_p,b_p)Y(k_p,b_p)$, where (for the PUSC tile format 200) p=1, 2, 3, 4 and $k_1=0, k_2=0, k_3=3, k_4=3, b_1=0, b_2=2, b_3=0, b_4=2$. In the preferred embodiment the MSE module 438 determines a MSE for each sequence, $$MSE(s) = \sum_{p=1}^{4} (\hat{x}_s(k_p, b_p) - 1)^2$$

(this MSE is the MSE associated with the interfering wireless device's pilot sequence s). In an alternate embodiment, the MSE can include the MSE to the data symbols as well as the pilot symbols. In this embodiment, symbol estimates for data symbols are determined by the signal estimator 432. This is possible by calculating the MSE to the data symbols by analyzing the distance between the symbol estimate and the symbol estimate mapped to a closest constellation point. If an average channel estimate from the channel estimate module 428 is used in this embodiment only one combining weight needs to be calculated per PUSC tile 200.

The interference suppression module 126 selects the combining weights for the desired user as the weights associated with the interferer pilot sequence with the smallest MSE. (If needed, the channel estimates to the desired user and the interferer are also available.) The received signal is then passed to the decoder 434 and the data within the received signal is decoded using the combining weights associated with the lowest MSE.

Interference Suppression: Multiple Interferers

The base station 118 can also receive interfering PUSC tiles 200 from a plurality of interfering devices (i.e., from a dominant interferer plus one or more other interferers). The following embodiment assumes that there is one dominant interferer in the plurality of interferers, but the present invention is also applicable to multiple strong interferers. In the embodiment of multiple interferers, channels are estimated to the desired user and the dominant interferer. All remaining interference (i.e. interference from the non-dominate interferers) is found by estimating each of these interferer's spatial correlation matrix using a spatial correlation reconstruction method as discussed in greater detail below.

As discussed above, the channel estimate module 428 determines a channel estimate for the desired mobile (l=1) and the dominant interferer (l=2) for receive antenna m and each of the eight interferer pilot sequences from Table 1 (s=1, . . . 8), $\hat{H}_{m,l,s}(k,b)$. This channel estimate can be either the MMSE channel estimator discussed above, the average channel estimator discussed above, or any other channel estimate found using any future or current channel estimator. The interference suppression module 126, for each possible interferer pilot sequence, estimates a M×1 noise plus residual interference signal at the pilot locations (p=1, 2, 3, 4 and $k_1=0, k_2=0, k_3=3, k_4=3, b_1=0, b_2=2, b_3=0, b_4=2$.) as:

$$Z_s(k_p,b_p)=Y(k_p,b_p)-H_{1,s}(k_p,b_p)-P_{p,s}H_{2,s}(k_p,b_p) \quad \text{(Eq. 20)}$$

where $P_{p,s}$ is the $p^{th}$ interferer pilot symbol for sequence s (from Table 1) and $H_{l,s}(k,b)$ is an M×1 channel estimate for user l with its $m^{th}$ element being $\hat{H}_{m,l,s}(k,b)$ The spatial correlation matrix estimator 436 estimates an M×M spatial correlation matrix for the remaining interference plus noise for each possible interferer sequence as:

$$Q_s = \sigma_n^2 I_M + \sum_{p=1}^{4} Z_s(k_p, b_p) Z_s^H(k_p, b_p) \quad \text{(Eq. 21)}$$

where $\sigma_n^2 I_M$ is used to ensure that $Q_s$ is full rank.

The combining weight calculator 430 determines combining weights to the desired user for each sequence from:

$$w_s(k,b)=(R_s(k,b))^{-1}H_{1,s}(k,b) \quad \text{(Eq. 22)}$$

where M×M $R_s(k,b)$ is given as ($H_{l,s}(k,b)$ is an M×1 channel estimate for user l with its $m^{th}$ element being $\hat{H}_{m,l,s}(k,b)$):

$$R_s(k,b)=Q_s+H_{1,s}(k,b)H_{1,s}^H(k,b)+H_{2,s}(k,b)H_{2,s}^H(k,b) \quad \text{(Eq. 23)}$$

It should be noted that for an average channel estimator, there is only one weight over the entire PUSC tile 200.

The signal estimate module 432 determines received signal estimates at each pilot symbol for each interferer pilot sequence, $\hat{x}_s(k_p,b_p)=w_s^H(k_p,b_p)Y(k_p,b_p)$, where p=1, 2, 3, 4 and $k_1=0, k_2=0, k_3=3, k_4=3, b_1=0, b_2=2, b_3=0, b_4=2$. The MSE module 438 determines a MSE for each sequence, $$MSE(s) = \sum_{p=1}^{4} (\hat{x}_s(k_p, b_p) - 1)^2.$$

If an average channel estimate module 428 is used in this embodiment only one combining weight needs to be calculated per PUSC tile 200.

The interference suppression module 126 selects the combining weights for the desired user as the weights associated with the interferer pilot sequence with the smallest MSE. (If needed, the channel estimates to the desired user and the interferer are also available.) The received signal is then passed to the decoder 434 and the data within the received signal is decoded using the combining weights associated with the lowest MSE.

Wireless Communication Device

Figure 5:
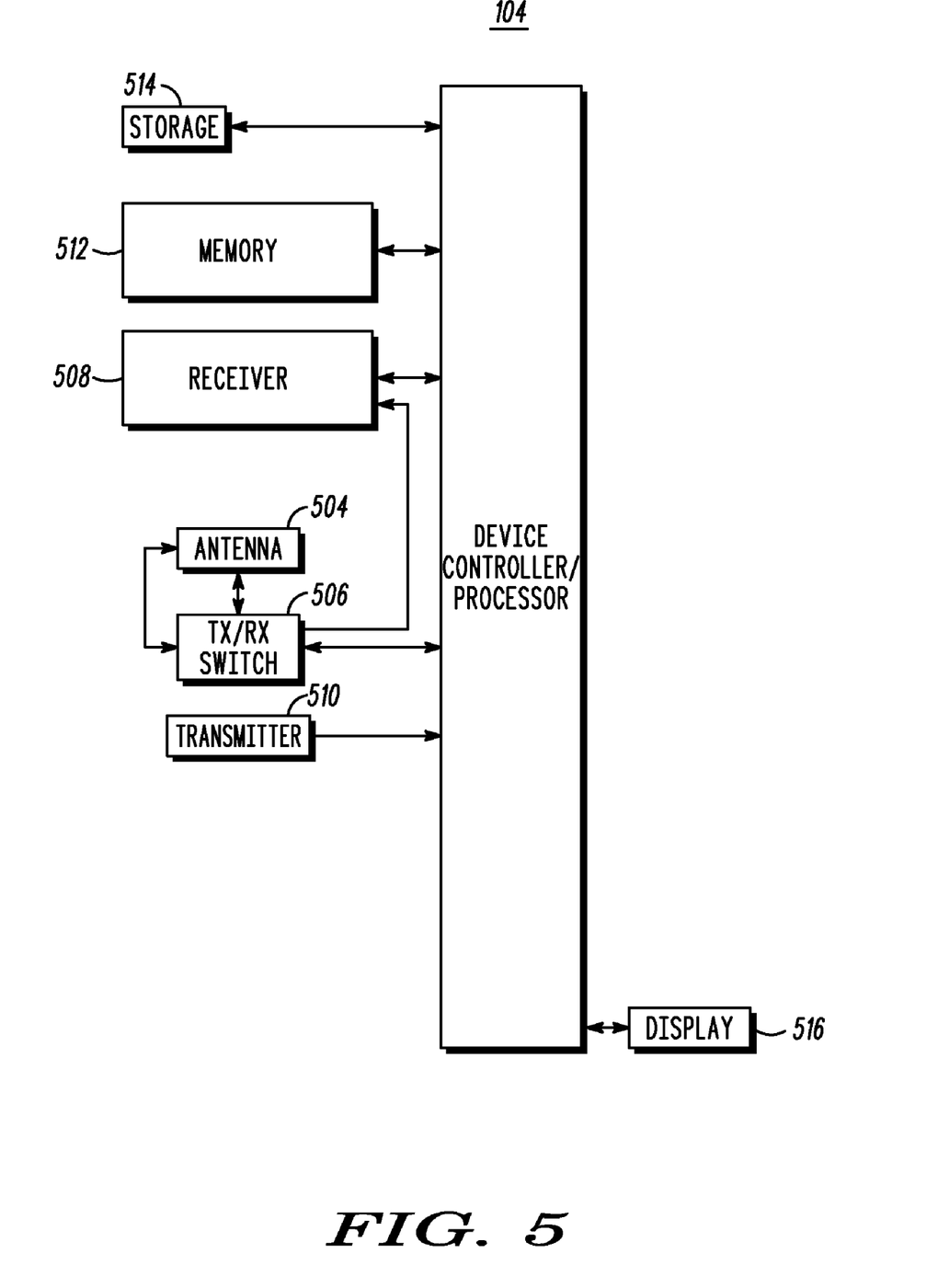
FIG. 5 is a block diagram illustrating a wireless communication device according to an embodiment of the present invention.

FIG. 5 is a block diagram illustrating a detailed view of the wireless communication device 104 according to an embodiment of the present invention. It should be noted that FIG. 5 illustrates only one example of a wireless communication device. Other wireless communication devices such as wireless communication air interface cards are also compatible with the present invention and comprise many of the same components that are discussed below.

In one embodiment, the wireless communication device 104 is capable of transmitting and receiving wireless information on the same frequency such as in an 802.16 system using TDD. The wireless communication device 104 operates under the control of a device controller/processor 502, that controls the sending and receiving of wireless communication signals. In receive mode, the device controller 502 electrically couples an antenna 804 through a transmit/receive switch 506 to a receiver 508. The receiver 508 decodes the received signals and provides those decoded signals to the device controller 502.

In transmit mode, the device controller 502 electrically couples the antenna 504, through the transmit/receive switch 506, to a transmitter 510. The device controller 502 operates the transmitter and receiver according to instructions stored in the memory 512. These instructions include, for example, a neighbor cell measurement-scheduling algorithm.

The wireless communication device 104, also includes non-volatile storage memory 514 for storing, for example, an application waiting to be executed (not shown) on the wireless communication device 104. The wireless communication device 104 also includes a display 516 for displaying information to the user of the wireless communication device 104. It should be noted that the wireless device 104 can also include one or more user interfaces, controllers, notification interfaces, and the like. These have not been shown in FIG. 5 for simplicity.

Process of Suppressing Interference

Figure 6:
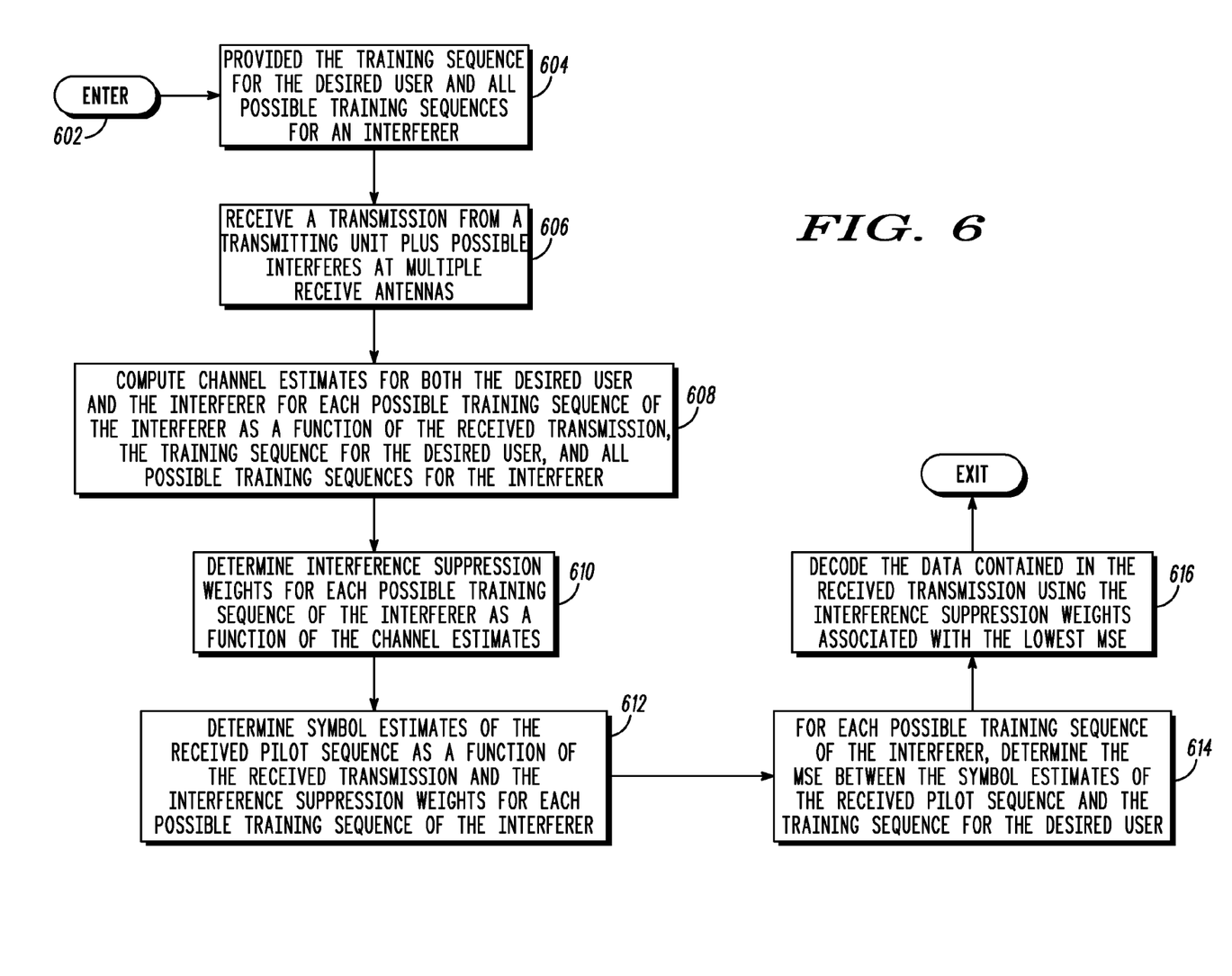
FIG. 6 is an operational flow diagram illustrating a process of suppressing interference in a wireless communication system according to an embodiment of the present invention.

FIG. 6 is an operational diagram illustrating a process of suppressing interference in an 802.16 communications system. The operational flow diagram of FIG. 6 begins at step 602 and flows directly to step 604. The receiver 414, at step 604, receives (or determines) a training sequence associated with the desired user and all possible training sequences for the dominant interfering user. For example, the training sequences (a training sequence is the same as the pilot sequence and for the PUSC tile 200 example consists of four pilot symbols) are stored in a memory unit and made available to the receiver 414 for use in estimating the channels to the desired user and the dominant interferer. The receiver 414, at step 606, receives a transmission from the desired user and one or more interfering devices at multiple receive antennas (for example a PUSC tile 200 is received from the desired user on a given frequency and time resource and an interfering PUSC tile 200 is received from an interferer on the same frequency and time resource). The interference suppression module 126, at step 608, determines channel estimates for both the desired user and the interfering device for each possible training sequence of the interferer (for example all sequences given in Table 1). The channel estimates are determined are calculated as a function of the received transmission, the training sequence for the desired user, and all possible training sequences for the interferer. At this step 608 there is a channel estimate for the desired user for each pilot sequence associated with the interfering wireless device and a channel estimate for the interferer for each pilot sequence associated with the interfering wireless device.

The interference suppression module 126, at step 610, determines interference suppression weights (combining weights) for each possible training sequence of the interferer as a function of the channel estimates (hence there is an interference suppression weight for each pilot sequence associated with the interfering wireless device). For each possible training sequence of the interferer, symbol estimates, at step 612, of the received pilots sequence are determined as a function of the received transmission and the interference suppression weights for each possible training sequence of the interferer (hence there is a symbol estimate for each pilot sequence associated with the interfering wireless device). For each possible training sequence of the interferer, the interference suppression module 126, at step 614, determines the MSE between the symbol estimates of the received pilot sequence and the training sequence for the desired user (hence is be a MSE for each pilot sequence associated with the interfering wireless device). The data included in the received transmission, at step 616, is decoded using the interference suppression weights associated with the lowest MSE (the weights associated with the lowest MSE are also known as the best set of combining weights). The control flow exits at step 618.

Another Process of Suppressing Interference

Figure 7:
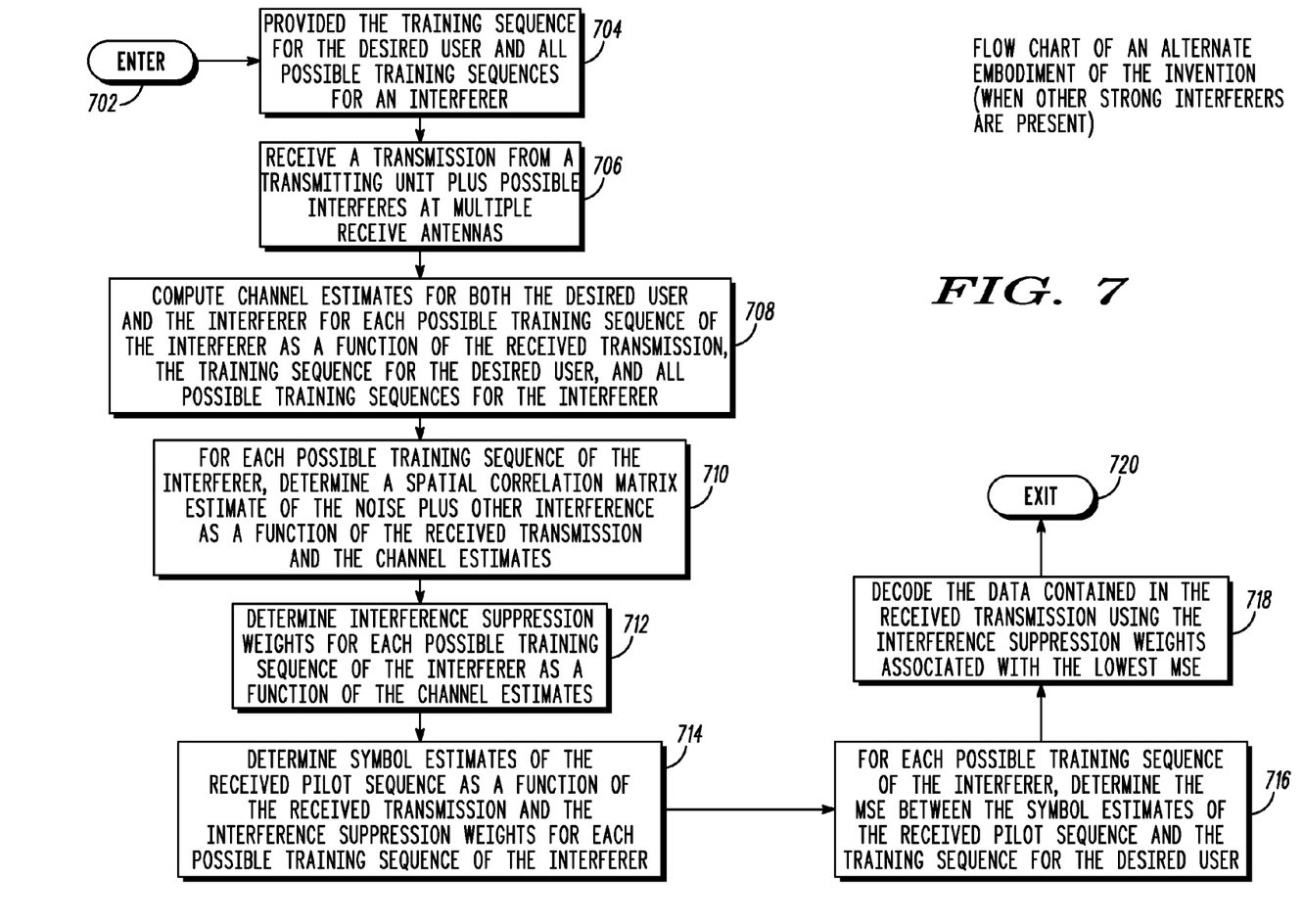
FIG. 7 is an operational flow diagram illustrating another process of suppressing interference in a wireless communication system according to an embodiment of the present invention.

FIG. 7 is an operational diagram illustrating another process of suppressing interference in an 802.16 communications system. FIG. 7 shows a process of suppressing interference when multiple strong interferers are present. The operational flow diagram of FIG. 7 begins at step 702 and flows directly to step 704. The receiver 414, at step 704, receives a training sequence associated with the desired user and all possible training sequences for one of the interferers (i.e., the dominant interferer). For example, the training sequences (a training sequence is the same as the pilot sequence and for the PUSC tile 200 example consists of four pilot symbols) are stored in a memory unit and made available to the receiver 414 for use in estimating the channels to the desired user and the dominant interferer.

The receiver 414, at step 706, receives a transmission from the desired user and one or more interfering devices at multiple receive antennas (for example a PUSC tile 200 is received from the desired user on a given frequency and time resource and an interfering PUSC tile 200 is received from an interferer on the same frequency and time resource). The interference suppression module 126, at step 708, determines channel estimates for both the desired user and one of the interfering devices for each possible training sequence of the interferer (for example all sequences given in Table 1). The channel estimates are determined are calculated as a function of the received transmission, the training sequence for the desired user, and all possible training sequences for the interferer.

The interference suppression module 126, at step 710, determines a spatial correlation matrix estimate of the noise plus other interference as a function of the received transmission and the channel estimates. This determination is performed for each possible training sequence of the interferer. The interference suppression module 126, at step 712, determines interference suppression weights (combining weights) for each possible training sequence of the interferer as a function of the channel estimates and the spatial correlation matrices.

For each possible training sequence of the interferer, symbol estimates, at step 714, of the received pilots sequence are determined as a function of the received transmission and the interference suppression weights for each possible training sequence of the interferer. The interference suppression module 126, at step 716, determines the MSE between the symbol estimates of the received pilot sequence and the training sequence for the desired user. This step is performed for each possible training sequence of the interferer. The data included in the received transmission, at step 718, is decoded using the interference suppression weights associated with the lowest MSE (the weights associated with the lowest MSE are also known as the best set of combining weights). The control flow then exits at step 720.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, in a wireless communication system, for suppressing interference, the method comprising:

receiving, via each antenna of a plurality of receiver antennas, a transmission from a target wireless device;

receiving, via each antenna of the plurality of receiver antennas, a transmission from an interfering wireless device;

determining a set of pilot sequences associated with the interfering wireless device;

determining a set of pilot sequences associated with the target wireless device;

determining a set of weights for channel estimation associated with the set of pilot sequences associated with the interfering wireless device;

determining a set of weights for channel estimation associated with the set of pilot sequences associated with the target wireless device;

determining, in association with each antenna of the plurality of receiver antennas, a channel estimate for the target wireless device for each pilot sequence in the set of pilot sequences associated with the interfering wireless device and a channel estimate for the interfering wireless device for each pilot sequence in the set of pilot sequences associated with the interfering wireless device as a function of the received transmissions, the set of pilot sequences associated with the interfering wireless device, the set of pilot sequences associated with the target wireless device, the set of weights associated with the set of pilot sequences associated with the interfering wireless device, and the set of weights associated with the set of pilot sequences associated with the target wireless device;

determining another set of weights, wherein the another set of weights comprises combining weights for each pilot sequence in the set of pilot sequences associated with the interfering wireless device as a function of the determined channel estimate of the target wireless device and the channel estimate of the interfering wireless device; and determining at least one pilot symbol estimate for the target communication device for each pilot sequence in the set of pilot sequences associated with the interfering wireless device as a function of the received transmission and the determined another set of weights, wherein, each combining weight of the another set of weights is applied to the received transmission from the target wireless device and the transmission from the interfering wireless device across all antennas of the plurality of receiver antennas in order to determine the at least one pilot symbol estimate.

2. The method of claim 1, wherein the received transmission from the target wireless device includes the set of pilot sequences and data associated with the target wireless device.

3. The method of claim 1, wherein the set of pilot sequences associated with the interfering wireless device is a plurality of pilot sequences.

4. The method of claim 1, wherein the transmission received from the target wireless device is received on a Partial Usage of SubChannels uplink utilizing an IEEE 802.16 standard.

5. The method of claim 1, further comprising:

determining a mean squared error estimate between the at least one pilot symbol estimate for each pilot sequence in the set of pilot sequences associated with the interfering wireless device and the set of pilot sequences of the target wireless device.

6. The method of claim 5, further comprising:

selecting a subset of combining weights from the another set of weights associated with each pilot sequence in the set of pilot sequences for the interfering wireless device, wherein the subset of combining weights is a set of combining weights associated with a pilot symbol estimate for each pilot sequence in the set of pilot sequences associated with the interfering wireless device with a lowest mean squared error estimate; and decoding the received transmission to obtain data using the subset of combining weights.

7. The method of claim 1, wherein the channel estimate for the target wireless device and the channel estimate for the interfering wireless device is determined by one of a minimum mean squared error channel estimator and an average channel estimator.

8. The method of claim 1, wherein a single combining weight is determined if an average channel estimate was determined for both the target wireless device and the interfering wireless device.

9. The method of claim 1, further comprising:

determining a spatial correlation matrix estimate associated with each pilot sequence in the set of pilot sequences associated with the interfering wireless device as a function of the received transmission from the target wireless device and the transmission from the interfering wireless device and the channel estimate for the target wireless device and the channel estimate for the interfering wireless device.

10. The method of claim 9, wherein the determining the another set of weights further comprises determining the another set of weights as a function of the spatial correlation matrix associated with each pilot sequence associated with the interfering wireless device.

11. An information processing system in a wireless communications system for suppressing interference, the information processing system comprising:

a memory;

a processor communicatively coupled to the memory; and an interference suppression module communicatively coupled to the memory and the processor, wherein the interference suppression module is configured to:

receive, via each antenna of a plurality of receiver antennas, a transmission from a target wireless device;

receive, via each antenna of the plurality of receiver antennas, a transmission from an interfering wireless device;

determine a set of pilot sequences associated with the interfering wireless device;

determine a set of pilot sequences associated with the target wireless device;

determine a set of weights for channel estimation associated with the set of pilot sequences associated with the interfering wireless device;

determine a set of weights for channel estimation associated with the set of pilot sequences associated with the target wireless device;

determine, in association with each antenna of the plurality of receiver antennas, a channel estimate for the target wireless device for each pilot sequence in the set of pilot sequences associated with the interfering wireless device and a channel estimate for the interfering wireless device for each pilot sequence in the set of pilot sequences associated with the interfering wireless device as a function of the received transmissions, the set of pilot sequences associated with the interfering wireless device, the set of pilot sequences associated with the target wireless device, the set of weights associated with the set of pilot sequences associated with the interfering wireless device, and the set of weights associated with the set of pilot sequences associated with the target wireless device;

determine another set of weights, wherein the another set of weights comprises combining weights for each pilot sequence in the set of pilot sequences associated with the interfering wireless device as a function of the determined channel estimate of the target wireless device and the channel estimate of the interfering wireless device; and determine at least one pilot symbol estimate for the target communication device for each pilot sequence in the set of pilot sequences associated with the interfering wireless device as a function of the received transmission and the determined another set of weights, wherein, each combining weight of the another set of weights is applied to the received transmission from the target wireless device and the transmission from the interfering wireless device across all antennas of the plurality of receiver antennas in order to determine the at least one pilot symbol estimate.

12. The information processing system of claim 11 wherein the set of pilot sequences associated with the interfering wireless device is a plurality of pilot sequences.

13. The information processing system of claim 11, wherein the transmission from a target wireless device is received on a Partial Usage of SubChannels uplink utilizing an IEEE 802.16 standard.

14. The information processing system of claim 11, wherein the interference suppression module is further configured to:

determine a mean squared error estimate between the at least one pilot symbol estimate for each pilot sequence in the set of pilot sequences associated with the interfering wireless device and the set of pilot sequences of the target wireless device.

15. The information processing system of claim 14, wherein the interference suppression module is further configured to:

select a subset of combining weights from the another set of weights associated with each pilot sequence in the set of pilot sequences for the interfering wireless device, wherein the subset of combining weights is a set of combining weights associated with a pilot symbol estimate for each pilot sequence in the set of pilot sequences associated with the interfering wireless device with a lowest mean squared error estimate; and decode the received transmission to obtain data using the subset of combining weights.

16. The information processing system of claim 11, wherein the interference suppression module is further configured to:

determine a spatial correlation matrix estimate associated with each pilot sequence in the set of pilot sequences associated with the interfering wireless device as a function of the received transmission from the target wireless device and the transmission from the interfering wireless device and the channel estimate for the target wireless device and the channel estimate for the interfering wireless device; and wherein the determining the another set of weights further comprises determining the another set of weights as a function of the spatial correlation matrix associated with each pilot sequence.

17. A wireless communications system for suppressing interference, the wireless communications system comprising:

a plurality of wireless communication devices;

a plurality of base stations, wherein each base station in the plurality of base stations is communicatively coupled to at least one wireless communication device in the plurality of wireless communication devices, wherein at least one base station in the plurality of base stations is communicatively coupled to an information processing system configured to:

receive, via each antenna of a plurality of receiver antennas, a transmission from a target wireless device;

receive, via each antenna of the plurality of receiver antennas, a transmission from an interfering wireless device;

determine a set of pilot sequences associated with the interfering wireless device;

determine a set of pilot sequences associated with the target wireless device;

determine a set of weights for channel estimation associated with the set of pilot sequences associated with the interfering wireless device;

determine a set of weights for channel estimation associated with the set of pilot sequences associated with the target wireless device;

determine, in association with each antenna of the plurality of receiver antennas, a channel estimate for the target wireless device for each pilot sequence in the set of pilot sequences associated with the interfering wireless device and a channel estimate for the interfering wireless device for each pilot sequence in the set of pilot sequences associated with the interfering wireless device as a function of the received transmissions, the set of pilot sequences associated with the interfering wireless device, the set of pilot sequences associated with the target wireless device, the set of weights associated with the set of pilot sequences associated with the interfering wireless device, and the set of weights associated with the set of pilot sequences associated with the target wireless device;

determine another set of weights, wherein the another set of weights comprises combining weights for each pilot sequence in the set of pilot sequences associated with the interfering wireless device as a function of the determined channel estimate of the target wireless device and the channel estimate of the interfering wireless device; and determine at least one pilot symbol estimate for the target communication device for each pilot sequence in the set of pilot sequences associated with the interfering wireless device as a function of the received transmission and the determined another set of weights, wherein, each combining weight of the another set of weights is applied to the received transmission from the target wireless device and the transmission from the interfering wireless device across all antennas of the plurality of receiver antennas in order to determine the at least one pilot symbol estimate.

18. The method of claim 17, wherein the set of pilot sequences associated with the interfering wireless device is a plurality of pilot sequences.

19. The wireless communications system of claim 17, wherein the transmission is received on a Partial Usage of SubChannels uplink utilizing an IEEE 802.16 standard.

20. The wireless communications system of claim 17, wherein the information processing system is further configured to:

determine a mean squared error estimate between the at least one pilot symbol estimate for each pilot sequence in the set of pilot sequences associated with the interfering device and the set of pilot sequences of the target wireless device;

select a subset of combining weights from the another set of weights associated with each pilot sequence in the set of pilot sequences for the interfering wireless device, wherein the subset of combining weights is a set of combining weights associated with a pilot symbol estimate for each pilot sequence in the set of pilot sequences associated with the interfering wireless device with a lowest mean squared error estimate; and decode the received transmission to obtain data using the subset of combining weights.

* * * * *